United States Patent [19]

Martin

[11] Patent Number: 4,701,724

[45] Date of Patent: Oct. 20, 1987

[54] INJECTION SWITCH AND DIRECTIONAL COUPLER

[75] Inventor: William J. Martin, Ft. Lauderdale, Fla.

[73] Assignee: Motorola, Inc., Schaumburg, Ill.

[21] Appl. No.: 885,890

[22] Filed: Jul. 15, 1986

[51] Int. Cl.[4] .............................................. H01P 1/15
[52] U.S. Cl. ................................... 333/103; 333/104;
333/109
[58] Field of Search ............... 333/101, 103, 104, 109,
333/115, 116

[56] References Cited

U.S. PATENT DOCUMENTS 4,001,821   1/1977   Nelson ............................ 333/109 X

FOREIGN PATENT DOCUMENTS 1150681   4/1985   U.S.S.R. ............................... 333/104

Primary Examiner—Paul Gensler
Attorney, Agent, or Firm—Martin J. McKinley; Daniel K. Nichols; Joseph T. Downey

[57] ABSTRACT

An R.F. switch includes a directional coupler with a main line and a quarter wavelength coupled arm. One end of the main line is connected to a first input port and the other end is connected to a first output port. The coupled arm is selectibly terminated at one end in either its characteristic impedance or a short. A PIN diode controls the termination. The second end of the coupled arm is connected to a second input port. A PIN diode switch is connected between the second end of the coupled arm and a second output port. In a first position, signals present at the input ports are combined and appear at the first output port. The directional coupler provides isolation such that the signal at the second input port is not coupled to the first input port. In the second position, the signal at the second input port is disconnected from the first output port and only connected to the second output port.

8 Claims, 4 Drawing Figures

FIG. 1 —PRIOR ART—

INJECTION SWITCH AND DIRECTIONAL COUPLER

BACKGROUND OF THE INVENTION

This invention relates to the field of radio frequency (R.F.) circuits and more particularly to circuits that employ directional couplers and PIN diode switches, and that find application in radio transceivers.

The radiation of undesired electromagnetic signals from a radio transceiver is generally referred to as spurious radiation. Spurious radiation is undesirable because of its potential to interfere with other radio receivers being operated nearby. Since radio receiver circuits usually employ at least one oscillator circuit, commonly known as the local oscillator, a primary source of spurious radiation is the "injection" signal generated by the local oscillator. In addition, circuit non-linearities produce harmonics, or integer multiples of the fundamental local oscillator frequency, which can also be spuriously radiated. Other osciallators, for example a second local osciallator or a clock osciallator for a microprocessor, are also potential sources of spurious radiation, as well as the mixing products of two or more of these oscillators.

Generally, there are two ways in which spurious signals can be radiated. First, the various conductors and components in the transceiver can operate as antennas by directly radiating the spurious signal. Direct radiation can usually be reduced to an acceptable level by electromagnetically shielding the offending circuit, by reducing the length of conductors that carry these signals, and by terminating transmission lines in their characteristic impedance to prevent large standing waves.

The second way in which spurious signals are radiated is by conduction, i.e., by unintentionally creating a conducting path between the source of the spurious signal and the antenna. For example, an amplifier which is connected in a path between the antenna and the source of a spurious signal can conduct in the reverse direction, from output to input; or in the forward direction, from input to output, even though the power to the amplifier is turned off. Conduction through an amplifier in such a manner is not without attenuation; however, if the attenuation is insufficient, a significant amount of spurious energy can be conducted to the antenna.

In FIG. 1, a prior art radio transceiver is illustrated that significantly reduces the amount of local osciallator energy that is conducted to the antenna. A receiver front end 102 includes cascaded band pass filter 104, R.F. amplifier 106, and band pass filter 108. A received signal is picked up by an antenna 110 and coupled to the input of band pass filter 104 by antenna switch 112. The mainline 116 of a directional coupler 118 is connected between the output of band pass filter 108 and the input of a mixer 120. An intermediate frequency (I.F.) stage 122, which includes a crystal filter and an amplifier, is connected to the output of mixer 120. The receiver back end 124, which includes a demodulator and an audio amplifier, is connected to the output of I.F. stage 122. The output of a local oscillator 126 is connected to the input of the coupled arm 127 of directional coupler 118 and the output of the coupled arm is terminated in its characteristic impedance by resistor 128.

Those skilled in the art will understand that directional coupler 118 couples the majority of the local oscillator energy to the input of mixer 120, but very little energy is coupled to the output of band pass filter 108. This significantly reduces the amount of local oscillator energy that is conducted to antenna 110 by flowing backwards through receiver front end 102 and antenna switch 112.

An injection buffer amplifier 130 couples the output of coupled arm 127 to one input of a mixer 132. A transmitter offset oscillator 134, which is modulated by modulator 136, is connected to the second input of mixer 132. The signal at the output of mixer 132 is the transmit signal which is directed to the input of an exciter 138. Those skilled in the art will recognize that the output of mixer 132 includes not only the desired transmit frequency, but also other frequency components that must be removed by exciter stage 138, such as by the use of a band pass filter or a phase lock loop. An R.F. power amplifier 140 is connected between the output of exciter 138 and the transmit input of antenna switch 112.

The particular transceiver architecture illustrated in FIG. 1 is commonly used when the difference or "split" between the transmit and receive frequencies is a fixed frequency. This is typical in transceiver designs that are intended to be operated in repeater systems that, by their nature, must receive and transmit on different frequencies. Thus, if the receiver frequency is changed by changing the frequency of receiver local oscillator 126, no change in the transmitter offset oscillator 134 is required because the transmit frequency is always the receive frequency plus or minus the split frequency. Those skilled in the art will recognize that where the local oscillator frequency is below the receive frequency ("low side injection"), and the transmit frequency is below the receive frequency, the selected output frequency from mixer 132 is the difference of the two input frequencies.

In the receive mode, the power to injection buffer 130, mixer 132, exciter 138 and R.F. power amplifier 140 is turned off. As previously stated, however, conduction of the local oscillator signal can occur through these stages, even though no power is applied. In addition, antenna switch 112 will couple a small amount of spurious energy present at its transmitter input (output of R.F. power amplifier 140) to antenna 110, even though the switch is presently in the receive position, i.e. antenna 110 is connected to receiver front end 102. To reduce this conducted spurious radiation, injection buffer 130 is typically designed to have a large insertion loss in the power off mode, thereby significantly reducing the strength of the local oscillator signal before it reaches the input of mixer 132.

It will be apparent that if the I.F. frequency equals the split frequency ($F_{I.F.}=F_{split}$) then the offset oscillator frequency goes to zero ($F_{offset}=0$). Therefore, offset oscillator 134 and mixer 132 could be eliminated and the output of injection buffer 130 would be connected to the input of exciter 138. It would be desirable, however, if injection buffer 130 could also be eliminated without increasing the conduction of spurious local oscillator energy to antenna 110 through exciter 138, R.F. power amplifier 140 and antenna switch 112.

In FIG. 2, a prior art PIN diode antenna or "T/R" switch is illustrated. A transmitter 202 is coupled to an antenna 204 by a coupling capacitor 206 and a PIN diode 208, wherein the cathode of the PIN diode is connected to the antenna. A receiver 210 is also connected to antenna 204 through a coupling capacitor 212 and a one-quarter wavelength transmission line 214.

The anode of a PIN diode 216 is connected to the junction of transmission line 214 and coupling capacitor 212, and its cathode is connected to ground. An R.F. choke 218 is connected between a source of DC bias voltage and the junction of coupling capacitor 206 and PIN diode 208.

In the transmit mode, the bias voltage is positive such that a DC bias current flows to ground through R.F. choke 218, PIN diode 208, transmission line 214 and PIN diode 216. This bias current switches PIN diodes 208 and 216 into the conducting state, such that the signal from transmitter 202 is coupled through PIN diode 208 to antenna 204, while PIN diode 216 shorts out the input of receiver 210 and one end of transmission line 214 to ground. It is well known that if a one-quarter wavelength transmission line is shorted at one end, the opposite end appears to be an open circuit. Therefore, because PIN diode 216 shorts one end of transmission line 214 in the transmit mode, the other end (the end connected to antenna 204) appears as an infinite impedance and substantially no energy from transmitter 202 flows through transmission line 214 to receiver 210.

In receive mode, the bias voltage is substantially at ground, thereby cutting off the DC bias current through R.F. choke 218, PIN diode 208, transmission line 214 and PIN diode 216. With no bias current through PIN diodes 208 and 216, both diodes are switched into a high impedance state. Because the PIN diodes are in a high impedance state, very little received signal energy is lost to ground through PIN diode 216, and transmission line 214 is terminated in its characteristic impedance by the input circuitry of receiver 210. Thus, the received signal at antenna 204 is coupled to the input of receiver 210 through transmission line 214 and coupling capacitor 212. In addition, no received signal energy is lost in the output circuit of transmitter 202 because the high impedance state of PIN diode 208 decouples the transmitter from antenna 204 in the receive mode.

SUMMARY OF THE INVENTION

Briefly, the invention is a switch that includes a directional coupler that has first and second nodes. A terminating means for terminating the directional coupler is connected to the first node. The terminating means has selectible zero and non-zero terminating impedances. Also included is a switching means that has an output. The switching means is connected to the second node and provides for selective coupling of the second node to the output.

In another embodiment, the switch has first and second input and output ports and is for use with first and second input signals. The first and second input ports are suitable for connection to the first and second input signals respectively. Included are a directional coupler that has a main line with one end coupled to the first input port and the other end coupled to the first output port. The directional coupler also has a one quarter wavelength long coupled arm with termination and input nodes at opposite ends. The input node is coupled to the second input port. Also included is a terminating means for terminating the coupled arm. The terminating means is coupled to the termination node and it has selectible zero and non-zero terminating impedances.

DESCRIPTION OF THE PREFERRED EMBODIMENT

Figure 3:
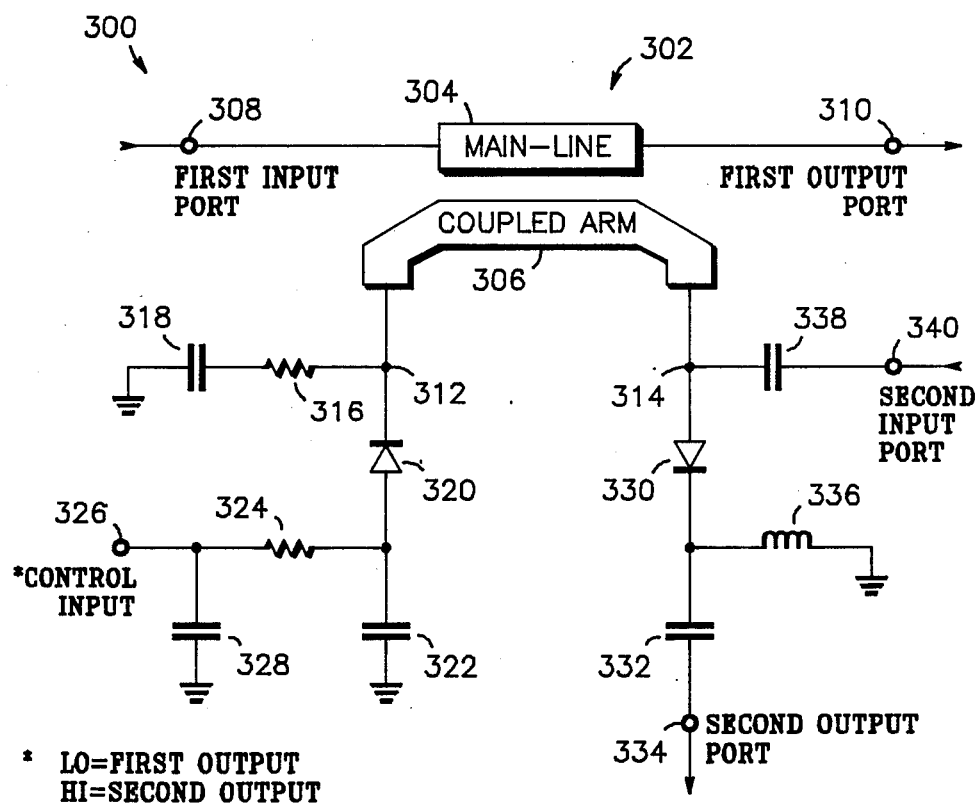
FIG. 3 is a schematic diagram of the preferred embodiment of the present invention.

In FIG. 3, a schematic diagram of the directional coupler and PIN diode switch is illustrated. A directional coupler 302 has a mainline 304 and a coupled arm 306. Directional coupler 302 is preferably constructed using well known microstrip or stripline construction, although other techniques may also be suitable. For optimal performance, mainline 304 is preferably one-quarter wavelength long at the operating frequency, however, shorter lengths may also be satisfactory. Coupled arm 306, however, should be one-quarter wavelength. One terminal of Mainline 304 is connected to a first signal input port 308 and the other terminal is connected to a first output port 310. Coupled arm 306 has a termination node 312 and an input node 314.

A series connected resistor 316 and capacitor 318 are connected between coupled arm termination node 312 and ground. The value of resistor 316 should be equal to the characteristic impedance of coupled arm 306, which is typically 50 Ohms, while the impedance of capacitor 318 should be a substantial short at the operating frequency. The cathode of a PIN diode 320 is connected to node 312 and the anode to one terminal of a capacitor 322. The other terminal of capacitor 322 is connected to ground. Since PIN diodes wil exhibit a small amount of inductance, the value of capacitor 322 is selected such that its capacitive reactance cancels out the inductive reactance of PIN diode 320 at the operating frequency. In other words, the inductance of PIN diode 320 and capacitor 322 form a series LC circuit that is resonant at the operating frequency. Thus, when PIN diode 320 is biased in the conducting state, the only significant impedance between termination node 312 and ground is the intrinsic resistance of PIN diode 320. A resistor 324 is connected between a control input terminal 326 and the junction of PIN diode 320 and capacitor 322. Bypass capacitor 328 provides a substantial short at the operating frequency between control input terminal 326 and ground.

The anode of a PIN diode 330 is connected to coupled arm input node 314 while its cathode is connected to one terminal of a capacitor 332. The other terminal of capacitor 332 is connected to second output port 334. An R.F. choke 336 is connected between the junction of PIN diode 330 and capacitor 332, and ground. R.F. choke 336 is selected to be anti-resonant at the operating frequency, thereby providing a high impedance to an R.F. signal and a short to DC bias current. Capacitor 332 is a coupling capacitor and its value is selected to be a substantial short at the operating frequency. Another capacitor 338 is connected between coupling arm input node 314 and second signal input port 340. Similar to PIN diode 320 and capacitor 322, the value of capacitor 338 is selected to be series resonant with the intrinsic inductance of PIN diode 330.

Control input terminal 326 accepts a binary input DC bias voltage with the low state (typically ground) selecting first output port 310 and the high state (typically 5 volts) selecting second output port 334. When control input 326 is high, current flows to ground through resistor 324, PIN diode 320, coupled arm 306, PIN diode 330, and R.F. choke 336. Thus, the value of resistor 324 is selected such that when control input terminal 326 is high, a sufficient amount of current flows through PIN diodes 320 and 330 to switch them into their ON or conducting state.

In operation, first and second R.F. signals are respectively applied to first input port 308 and second input port 340. When control input terminal 326 is low, no DC bias current flows through PIN diodes 320 and 330 and the diodes are in the OFF state. With pin diode 320 OFF, coupled arm 306 is terminated at node 312 in its characteristic impedance by resistor 316. When a transmission line, such as coupled arm 306, is terminated at one node (312) in its characteristic impedance, the impedance at the other node (314) will also be the characteristic impedance. Therefore, the second R.F. signal at input port 340 is coupled to node 314 through capacitor 338 and flows through coupling arm 306. Those skilled in the art will understand that directional coupler 302 couples the second R.F. signal from coupled arm 306 to first output port 310. However, substantially no signal energy is coupled in the reverse direction, i.e. towards first input port 308. When the second R.F. signal is coupled to first output port 310, it is also combined with the first R.F. signal that appears at first input port 308. Because PIN diode 330 is OFF when control input terminal 326 is low, second output port 334 is inactivated.

When control input port 326 is high, bias current flows to ground through resistor 324, PIN diode 320, coupled arm 306, PIN diode 330 and R.F. choke 336, thereby switching the PIN diodes into the ON or conducting state. As previously explained, the value of capacitor 322 was selected to tune out the inherent inductance in PIN diode 320. Thus, PIN diode 320 and capacitor 322 create a substantial short between node 312 of coupling arm 306 and ground. As previously explained, a one-quarter wavelength transmission line (coupled arm 306) which is shorted at one end (node 312) has an infinite impedance at the opposite end (node 314). Therefore, the second R.F. signal at port 340 does not flow through coupled arm 306, but instead, flows through PIN diode 330 and capacitor 332 to second output port 334.

Thus, it can be seen that resistor 316, capacitor 318, PIN diode 320 and capacitor 322 provide a means for terminating the coupled arm. This terminating means has selectible zero impedance through PIN diode 320 and capacitor 322, and non-zero impedance (preferably the characteristic impedance) through resistor 316 and capacitor 318. PIN diode 330 and capacitor 338 provide a switchable means for coupling the second input signal at second input port 340 to second output port 334. This switchable means has selectible ON and OFF modes. In addition, R.F. choke 336 and resistor 324 provide a control means for controlling the terminating and switching means.

Figure 1:
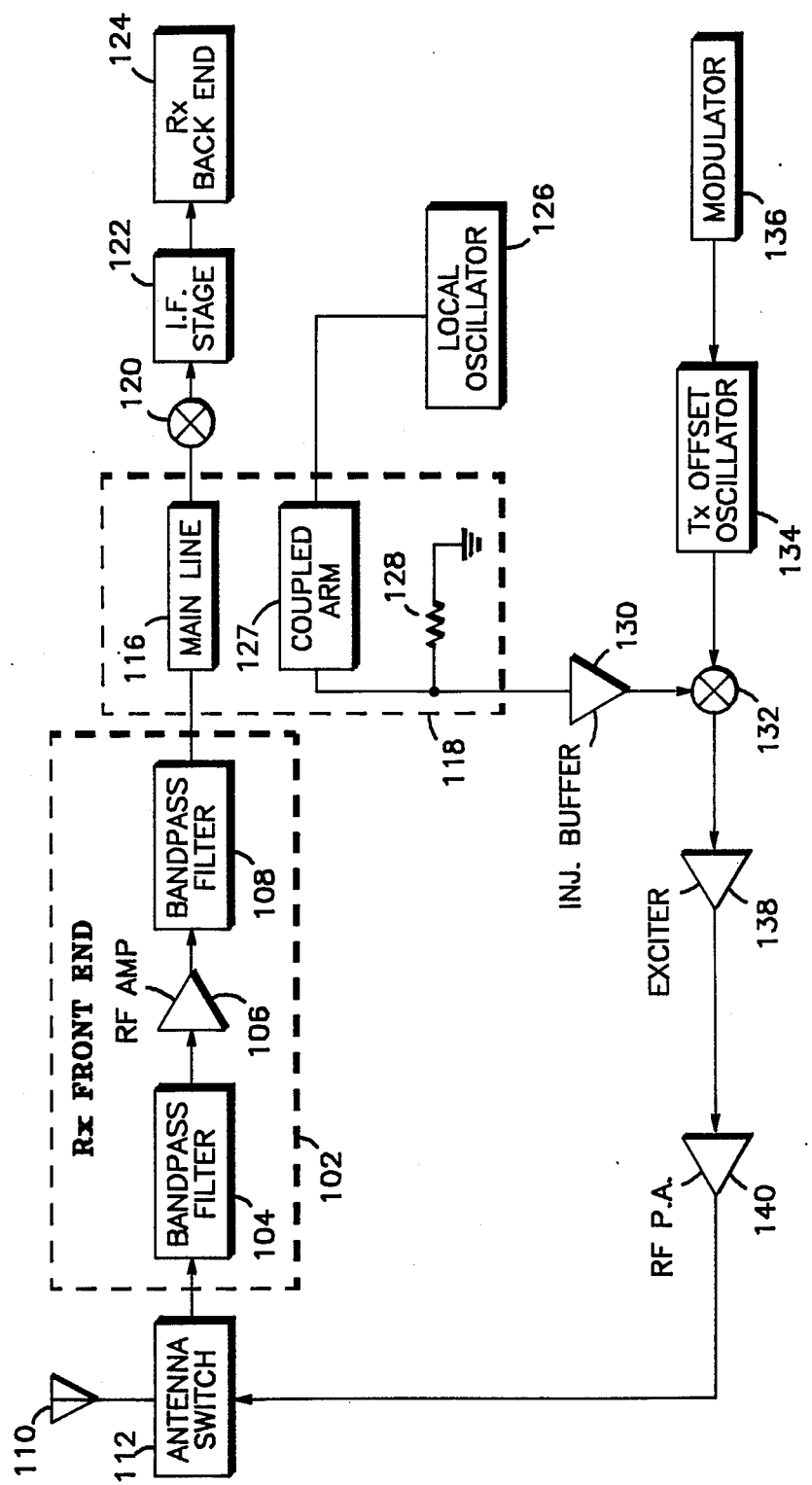
FIG. 1 is a block diagram of a prior art radio transceiver that utilizes a directional coupler to prevent local oscillator energy from being coupled to the antenna through the receiver front end.
Figure 2:
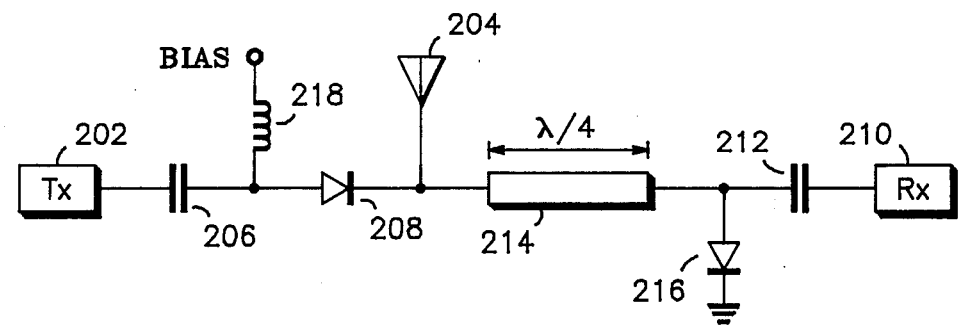
FIG. 2 is a diagram of a prior art antenna or "T/R" switch that utilizes PIN diodes.
Figure 4:
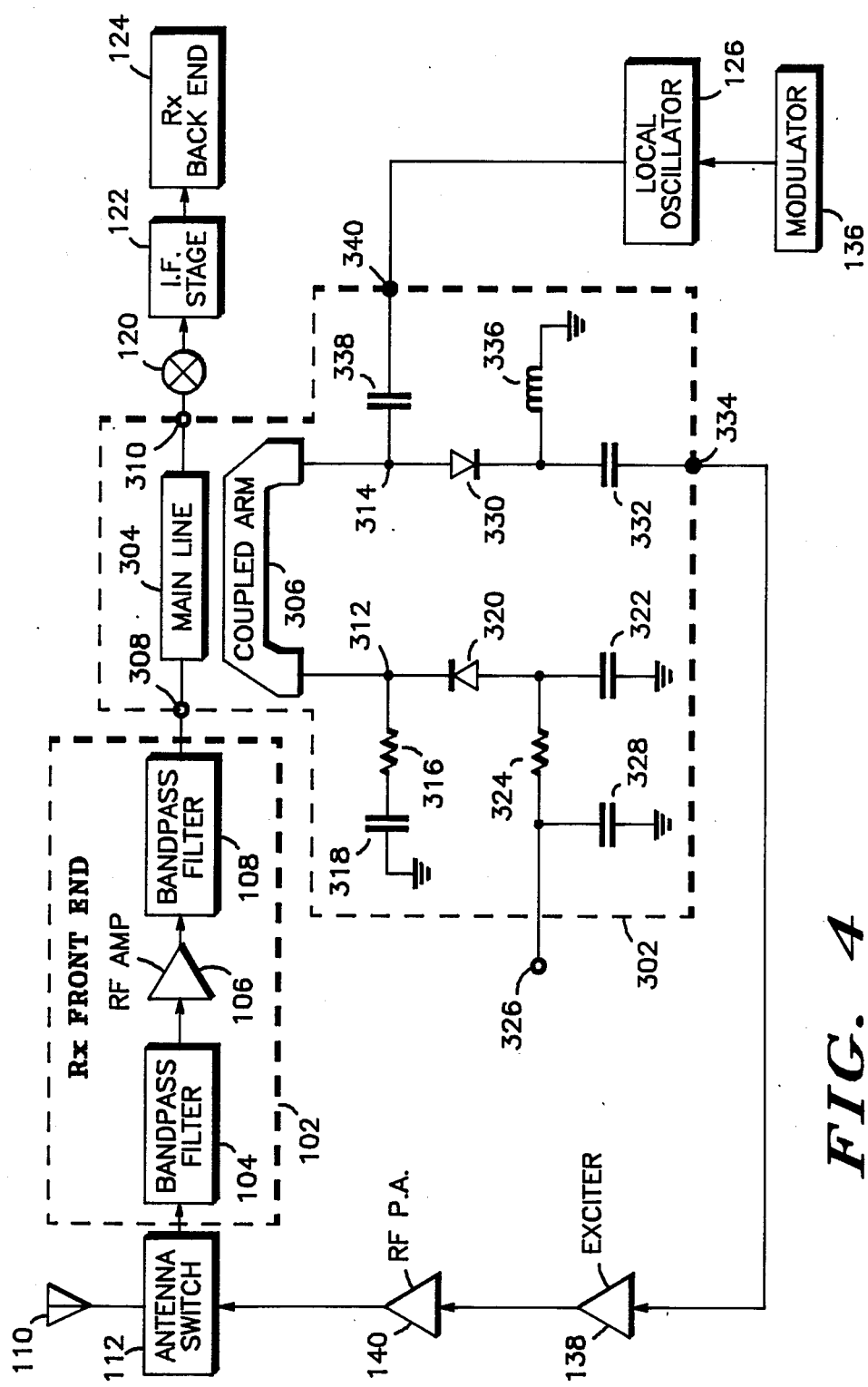
FIG. 4 is a block diagram of a radio transceiver that utilizes the present invention to prevent local oscillator energy from being coupled through the receiver front end to the antenna and from being coupled through the transmitter circuits to the antenna.

In FIG. 4, the preferred application of the present invention is illustrated. FIG. 4 is a combination block and schematic diagram of a radio transceiver wherein the split frequency, or the difference between the receive and transmit frequencies, is equal to the I.F. frequency. In FIG. 4, the various functional blocks are as indicated in FIG. 1, however, directional coupler 118, injection buffer 130, mixer 132 and offset oscillator 134 have been eliminated. Modulator stage 136 is now connected directly into local oscillator 126 and the output of the local oscillator is connected to the second input port 340 of the directional coupler and PIN diode switch of FIG. 3. In addition, the first input port 308 is connected to the output of band pass filter 108, the first output port 310 is connected to the input of mixer 120, and the second output port 334 is connected to the input of exciter 138.

In the receive mode, the bias voltage at control input port 326 is low, thereby switching OFF PIN diodes 320 and 330. The signal from local oscillator 126 is then coupled to the input of mixer 120, but the amount of local oscillator energy coupled to the output of band pass filter 108 is substantially attenuated. Since PIN diode 330 is switched OFF, only an insignificant amount of energy is coupled to the input of exciter 138. Therefore, the directional coupler and PIN diode switch 302 prevent both the conduction of local oscillator energy backwards through receiver front end 102 to antenna 110, and also prevent its conduction to the antenna through the transmitter circuits (exciter 138 and R.F. power amplifier 140) and antenna switch 112.

In the transmit mode, the control input 326 is switched high, thereby grounding node 312 of coupling arm 306. This causes coupling arm 306 to appear as a high impedance at node 314, thereby decoupling local oscillator 126 from mainline 304. In the transmit mode, PIN diode 330 is switched on, thereby permitting local oscillator energy to flow to exciter 138. Coupled arm 306 appears as a low impedance at node 314 for even order harmonics of local oscillator 126. Such even order harmonics are therefore shunted to ground through coupled arm 306, PIN diode 320 and capacitor 322. The value of capacitor 322 can be optimized to suppress any even order harmonic while providing an acceptable impedance level at node 314 to decouple the local oscillator 126 from mainline 304.

I claim as my invention:

1. A switch, comprising in combination:
   a directional coupler having first and second nodes and a coupling arm connected between said nodes;
   terminating means, connected to said first node, for terminating said directional coupler, said terminating means having selectable zero and non-zero terminating impedances, said terminating means includes a resistor coupled between said first node and ground, and a diode connected to said first node; and
   switching means, connected to said second node, said switching means having an output, for selectively coupling said second node to said output.

2. The switch of claim 1, wherein said terminating means further includes a capacitor coupled between said diode and ground, the capacitance of said capacitor being selected to series resonate with the intrinsic inductance of said diode.

3. The switch of claim 2, for use with a control voltage, wherein:
   said switching means includes a diode coupled to said second node; and
   further including control means, suitable for connection to said control voltage, for controlling said terminating and said switching means, said control means including an R.F. choke coupled to said diode of said switching means and a resistor coupled to said diode and said capacitor of said terminating means.

4. A switch having first and second input and output ports, for use with first and second input signals and a control voltage having first and second voltages, said first and second input ports suitable for connection to said first and second input signals respectively, said switch comprising in combination:
   a directional coupler including a main line having one end coupled to said first input port and the other end coupled to said first output port, and further including a substantially one quarter wavelength long coupled arm having termination and input nodes at opposite ends of said coupled arm, said input node being coupled to said second input port;
   terminating means, coupled to said termination node, for terminating said coupled arm, said terminating means having selectable zero and non-zero terminating impedances; and
   switching means, coupled between said coupled arm input node and said second input port, for coupling said input node to said second output port, said switch means having selectable ON and OFF modes;
   whereby, said first and second input signals are directed to said first output port when said non-zero terminating impedance and said OFF mode are selected, and said second input signal is directed solely to said second output port when said zero terminating impedance and said ON mode are selected.

5. The switch of claim 4, wherein:
said terminating means and said switching means are responsive to said control voltage;
   whereby said non-zero terminating impedance and said OFF mode are selected when said control voltage is at said first voltage; and
   said zero terminating impedance and said ON mode are selected when said control voltage is at said second voltage.

6. The switch of claim 4, wherein said switching means includes a PIN diode coupled to said input node of said coupled arm.

7. The switch of claim 4, wherein said terminating means includes a resistor and PIN diode connected to said termination node.

8. The switch of claim 7, further including a capacitor connected to said PIN diode, said capacitor having a capacitance selected to resonate with the intrinsic inductance of said PIN diode.

* * * * *